United States Patent

Mitchell et al.

[11] 3,939,944
[45] Feb. 24, 1976

[54] OIL-MIST LUBRICATION SYSTEM
[75] Inventors: William A. Mitchell; Charles V. Thayer, both of Springfield, Vt.
[73] Assignee: Bryant Grinder Corporation, Springfield, Vt.
[22] Filed: July 24, 1974
[21] Appl. No.: 491,572

[52] U.S. Cl. ............... 184/6.26; 137/604; 184/56 A
[51] Int. Cl.² .......................................... F01M 1/16
[58] Field of Search ........ 184/55 R, 55 A, 57, 56 R, 184/56 A, 1 E, 6.21, 6.22, 6.23, 6.26, 15 A, 26, 29, 49, 50 R, 50 A, 52, 53, 57, 1 R, 59; 222/195; 302/57, 53; 137/604

[56] References Cited

UNITED STATES PATENTS

| 992,503 | 5/1911 | Howard | 184/56 R |
|---|---|---|---|
| 1,336,905 | 4/1920 | Hunzicker | 184/55 A |
| 1,788,033 | 1/1931 | Slater | 184/55 A |
| 2,245,600 | 6/1941 | Medsker | 184/55 A |
| 2,245,601 | 6/1941 | Medsker | 184/55 A |
| 2,719,604 | 10/1955 | Allen | 184/55 A |
| 2,912,064 | 11/1959 | Friedell | 184/56 X |

FOREIGN PATENTS OR APPLICATIONS

| 652,562 | 10/1928 | France | 184/55 A |

*Primary Examiner*—Richard C. Pinkham
*Assistant Examiner*—Arnold W. Kramer
*Attorney, Agent, or Firm*—James H. Bower; Mitchell J. Hill

[57] ABSTRACT

The disclosure relates in general to an oil-mist lubrication system, and more particularly to the propagation of a mixture of oil-mist to bearings of a spindle, wheelhead, or the like by means of a blender-distributor unit. A first controlled amount of air from an air supply unit is fed through an oil-mist unit to produce a controlled high density oil mist. A second controlled amount of air from the air supply unit bypasses the oil-mist unit and is fed into an air chamber of a blender distributor unit. The high density oil mist is also fed into an oil-mist chamber of the blender distributor unit. A plurality of blending nozzles in the distributor unit extend from the exit side of the air chamber. A like plurality of tubes extend from the exit side of the oil-mist chamber of the distributor unit, each tube mounted coaxially within a respective nozzle whereby the blending area of the exit end of each tube within the nozzle produces a lower density oil-mist to be carried to the bearings. Depending upon the number of bearings to be lubricated, more or less exiting nozzles from the blender distributor unit can be utilized with the air pressure and high density oil mist being regulated accordingly as required.

3 Claims, 5 Drawing Figures

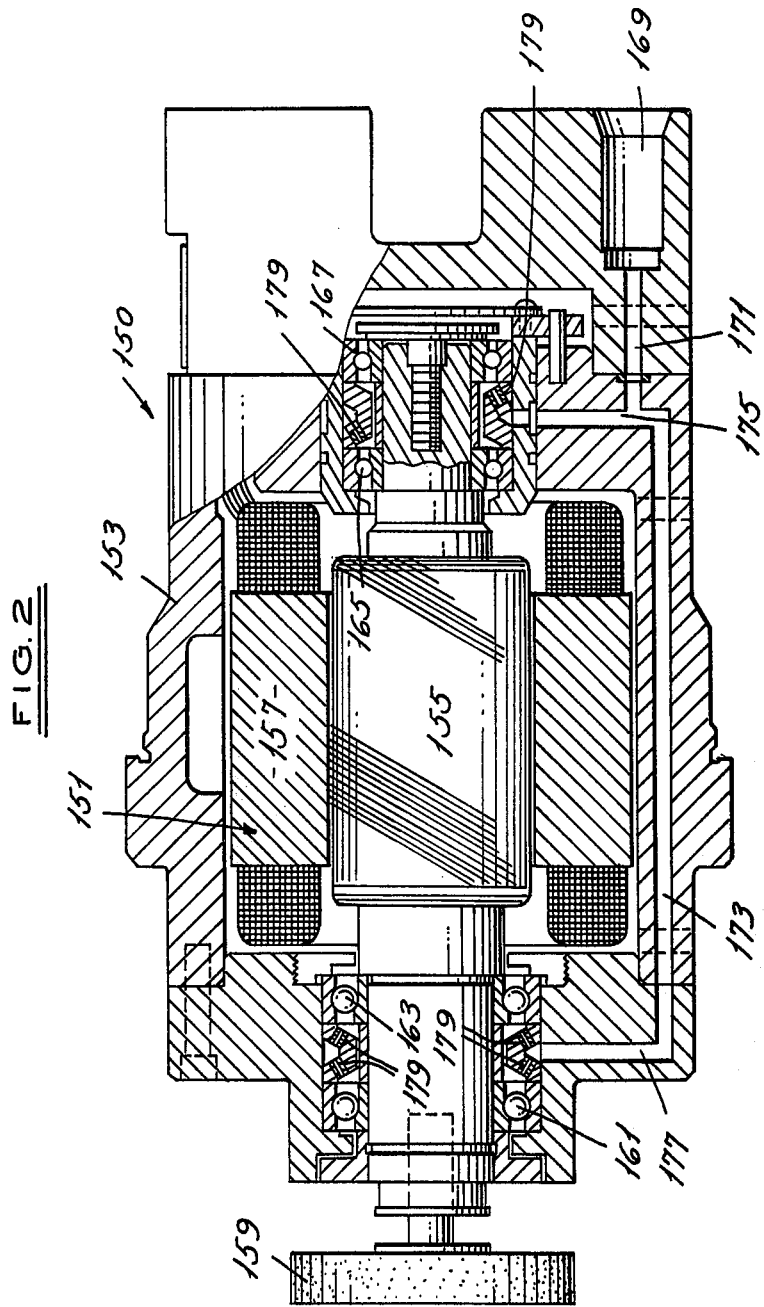

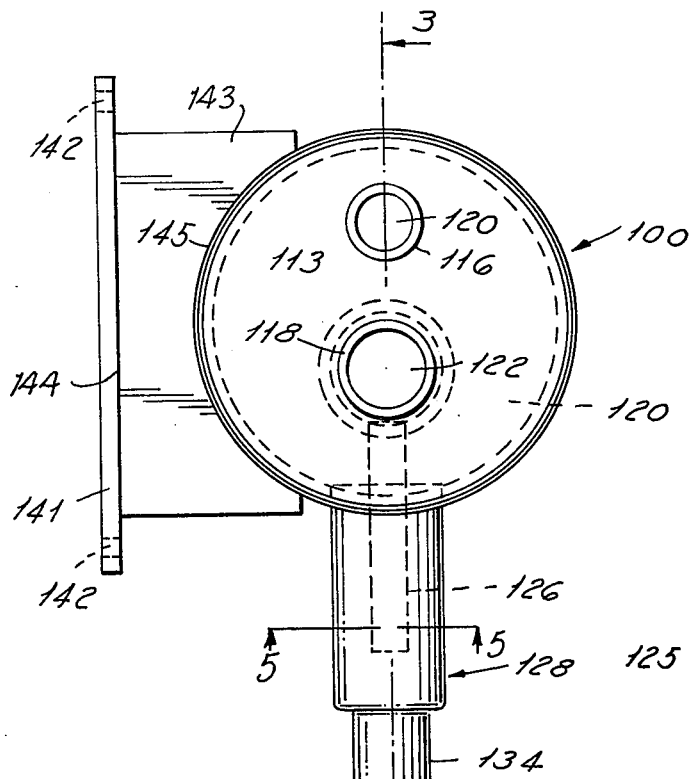
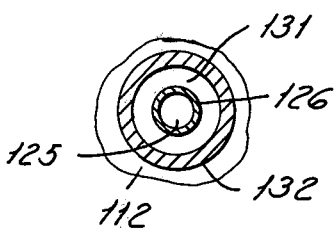
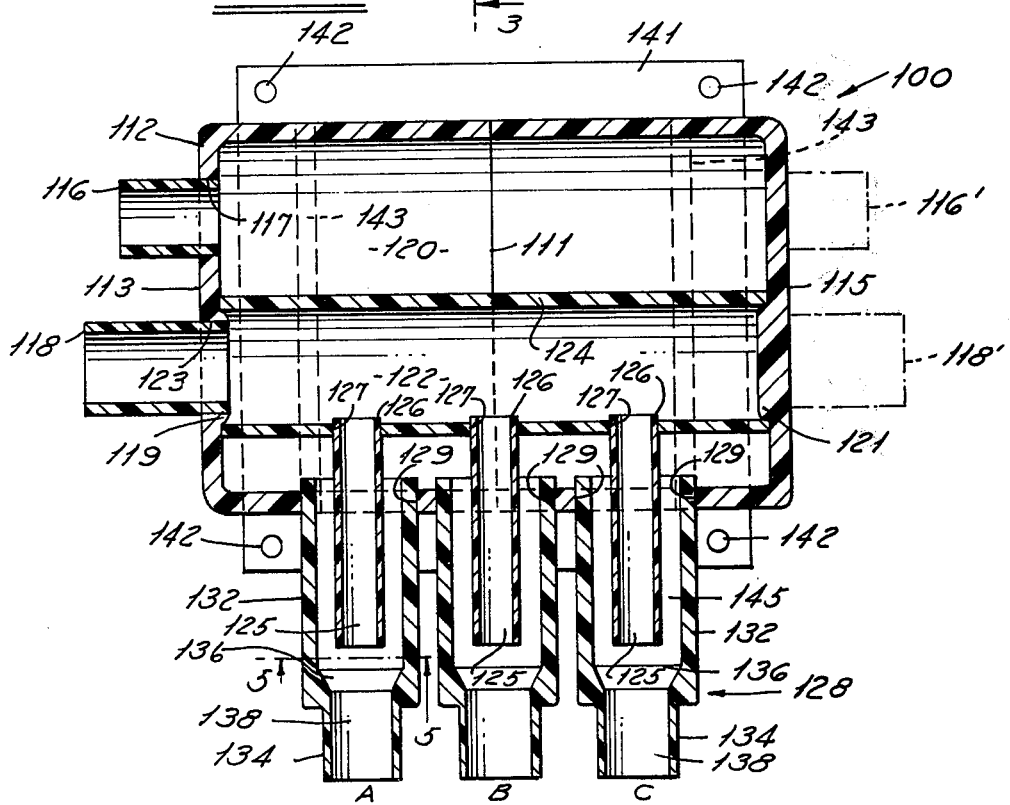

OIL-MIST LUBRICATION SYSTEM

BACKGROUND OF THE INVENTION

It is well known oil-mist lubrication systems often require the addition of bypass or extra air to obtain correct operating flows and pressures, and many oil-mist generators provide this additional air internally. However, it is desirable to provide improved mixing of the oil-mist by creating significantly less turbulence thereby reducing condensing or reclassification of the oil droplets in the blending chamber. The oil-mist is then distributed to the bearings of a spindle, wheelhead or the like through orifices which reclassify the oil mist thereby lubricating the bearing.

SUMMARY

In accordance with this invention, an oil-mist blenderdistributor unit in the form of two separate chambers is used, one chamber is for the oil-mist and the other chamber is for additional or bypass air. The chambers are joined by co-axial tubes which provide for blending the oil-mist and additional air without differential velocity and supplying the blended oil-mist and air to the bearings of spindles, wheelheads, etc., where reclassification occurs at the bearings by means of exiting of the oil-mist through the orifice of a nozzle.

The primary object and advantage of this invention is that the oil-mist quality is dependable, uniform and more equal for each outlet which permits the use of a single oil-mist generator and a single blender-distributor unit to supply a plurality of bearings.

DESCRIPTION OF DRAWINGS

FIG. 2 is a sectional view of the wheelhead.

FIG. 3 is a sectional view of the blender-distributor unit taken along line 3—3 in FIG. 4.

FIG. 4 is an end view of the blender-distributor unit.

FIG. 5 is a cross-sectional view of the blending area taken along line 5—5 of FIG. 3.

DESCRIPTION OF THE INVENTION

Figure 1:
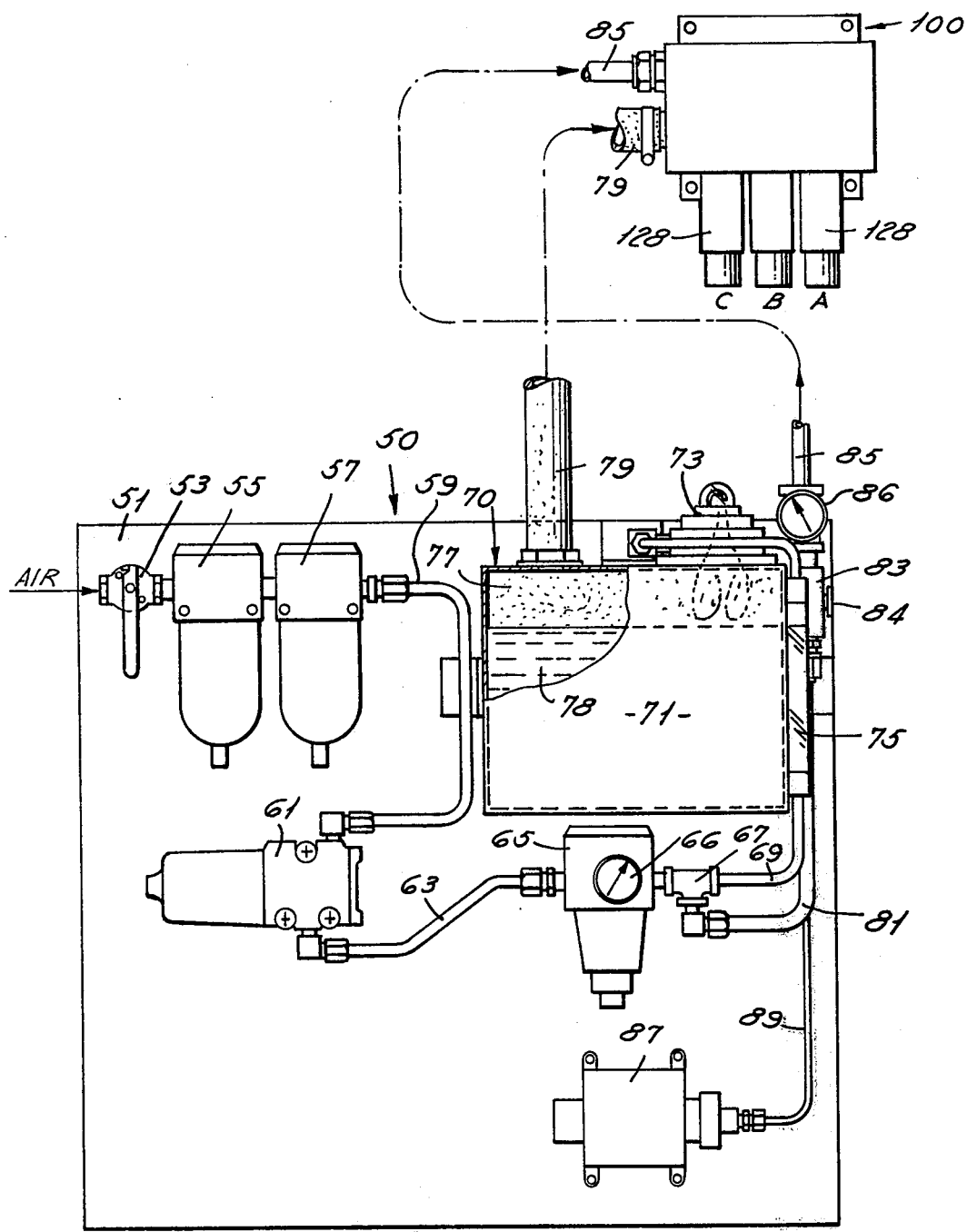
FIG. 1 is an end view of the oil-mist lubrication system.

In the drawing, FIG. 1 shows the oil-mist lubrication system comprising a blender-distributor unit 100 and an air and oil-mist supply unit 50 mounted on a panel 51 or in any other similar fashion. The supply unit 50 supplies air and oil-mist in a manner hereinafter described. Air is supplied through a valve 53 to a filter system comprising a 25 micron filter 55 and a 5 micron filter 57. The cleansed air is then supplied to the oil-mist supply unit 70, via conduit means 59 through a solenoid valve 61, through conduit means 63 to a pressure regulator 65 which sets the pressure of incoming air at approximately 35 p.s.i. A gauge 66 displays the pressure of incoming air. The air exits the pressure regulator 65 and is divided at tee 67. Incoming air via conduit means 69 enters reservoir 71 by means of a mist head 73, which is a unit bought commercially from Norgren, part no. 10-015-070. The reservoir 71 is a sealed unit that comprises a sight tube 75 to indicate oil level therein. As the oil-mist 77 is formed over the top of the oil 78, it is propelled through conduit means 79 to the oil-mist chamber of blender-distributor unit 100.

The bypass or additional air is exited from tee 67 through conduit means 81, through needle valve 83 through gauge 86, and thence through a conduit means 85 into the air chamber of blenderdistributor unit 100. The needle valve has an adjustable knob 84 thereon. When additional air is required, such as when an additional outlet is needed, the needle valve and pressure regulator are adjusted to provide additional bypass air into the system, and to maintain approximately 35 p.s.i. at gauge 66 and in conduits 69 and 81. A proportionate increase in the drip rate of the oil is accomplished by adjustment of a small needle valve located in the top of generator mist head 73. The density of the oil-mist in the reservoir unit 70 is consequently varied by changing the drip rate. That is, for supplying one wheelhead unit, 10 cfm of oil-mist is required at outlet A and 60 drops per minute of oil drip rate is required. For two outlets, 10 cfm of oil-mist required at outlets A and B, and the drip rate is increased to 120 drops per minute at the mist head 73. Density of oil-mist is determined for a given bearing size and application.

In case of air line failure, a pressure switch 87, connected to the system by means of conduit means 89 is adapted to stop the machine, thus protecting the bearings from overheating and ultimate failure.

In FIG. 3, the blender-distributor unit 100 blends the bypass air and high density oil-mist from the reservoir unit 70 creating a low density oil mist which is equally distributed to the bearings of a wheelhead, spindle, or the like. The unit 100 comprises a body 112 made of two halves and molded together as shown at 111. As a preferred embodiment, the unit is made of polycarbonate plastic and welded together by solvent at 111. Tubing 124 is inserted and solvent welded at each end of the end portions 113 and 115 to a boss portion 119 and 121 respectively, as the two halves of the body portion are brought together and solvent welded at 111. However, it is obvious to one skilled in the art that the unit can be made of metal and assembled together by other methods or means.

The body 112 comprises end portions 113 and 115 which seal the unit from the ambient atmosphere. Thus, the interior of body 112 includes two chambers, an air chamber 120 and an oil-mist chamber 122. The oil-mist chamber 122 is separated from the air chamber 120 by the wall or tubing 124. Tube 116 is connected to the air chamber 120 through a bore 117 in end portion 113, and tube 118 is connected to the oil-mist chamber 122 through a bore 123 of end portion 113. Each of the tubes 116 and 118 are connected with tubing for clean "bypass" air to enter the air chamber and oil-mist to enter the oil-mist chamber, respectively. FIG. 3 shows the unit as a left-hand mounting, however, for a right-hand mounting, end portion 115 would include tubes 116' and 118' and end portion 113 would be a solid portion.

One end of each of the delivery tubes 126 is connected through the wall of tubing 124 by means of bore 127 to the oil mist chamber 122. The other end of the delivery tubes is partially extended into the tubular blending nozzles 128 and mounted coaxially therewith. Each of the blending nozzle tubes 128 is connected to the air chamber 120 by means of a bore 129 in the body 112. Each of the blending nozzle tubes comprises a larger diameter 132 and a smaller diameter 134 to effectively provide for a blending chamber 136 and a smaller diameter delivery chamber 138, respectively.

The three blending nozzles are adapted to provide oil-mist lubrication to three required areas. That is, for example, the mixture at A is adapted to be exhausted to the bearings of a wheelhead shown FIG. 2, the mixture at B is adapted to be exhausted to the bearings of a rotary diamond dresser, and the mixture at C is adapted to be exhausted to the bearings of a workhead. However, it is well within the purview of one skilled in the art that the oil-mist lubrication unit can be adapted for a single exhaust purpose or for a plurality of exhaust purposes. The need is dependent upon the requirements necessary to provide oil-mist lubrication thereto. Moreover, it is quite practical to close off any unneeded outlets without affecting the output or outlets remaining in operation, so long as drip rate and pressures are consistent with the number of outlets being used. That is, when one outlet is removed or terminated, the drip rate is decreased by appropriate adjustment and the pressure regulator 65 is adjusted to maintain 35 p.s.i. at gauge 66 and therefore in conduits 69 and 81, and the needle valve 83 is adjusted to maintain 15 p.s.i. in conduit 85 and at gauge 86.

In operation, oil-mist is delivered to the oil-mist chamber 122 from the oil-mist supply unit 70, under pressure of approximately 15 p.s.i., and clean "bypass" air is supplied to the air chamber 120 from pressurized air that comes from the air supply bypassing the oil-mist supply unit 70. The air is also under pressure of approximately 35 p.s.i. with air and oil-mist under pressures mentioned supplied to the inlets 116 and 118 respectively, and hence exiting from the openings A, B, C. Oil-mist flows through the passage 125 of tube 126 into the blending chamber 136 of blending nozzle tube 128 and thence through a delivery chamber 138. in operation, air passing from the air chamber 120 into the enlarged tubular diameter 132 is emitted into blending chamber 136, and thereby blends wuth oil-mist from the oil-mist chamber 122 via passage 125 of tube 126. The mixture of air and oil-mist in the blending chamber 136 is exited through the delivery chamber 138 to the preselected areas required by a machine, such as spindle bearings, wheelhead bearings, workspindle bearings or the like by conduit means connected to diameter 134.

FIG. 5 shows a cross-sectional area of the blending chamber as the air and oil-mist blend together to form a low density oil mist which is distributed to the bearings. The velocity of bypass air in the blending area is equal to the velocity of oil-mist exiting through passage 125 of tube 126. It is important to realize that there is no increase in velocity in this area. The velocity of air and the velocity of the oil-mist is equal by design, that is, the ratio of areas 125 and 131 is approximately one to ten. These areas are designed so that the velocity of oil-mist and the velocity of air are equal in the blending chamber 136.

FIG. 2 shows a wheelhead 159 comprising a motor assembly 151 mounted in a housing 153. The motor comprises a stator 157 and a rotatable shaft 155,. The rotatable shaft in FIG. 2, shows a grinding wheel 159 mounted thereon, however, the motor is adapted to be used for other uses well within the purview of one skilled in the art. The shaft 155 is rotatably mounted on bearings 161, 163, 165 and 167 mounted within the housing 153.

Oil-mist propelled from the blender-distributor unit 100 enters the wheelhead 150 by means of an opening 169 in the housing 153. The oil-mist is thence propelled through channels 171, 173, 175 and 177 to nozzles 179 located adjacent the bearings. Each nozzle is adapted to provide each bearing oil-mist at approximately 15 p.s.i. As the oil-mist exudes through the orifice of each nozzle it reclassifies or condenses into droplets of oil, thereby providing for instant lubrication to the bearing at the point of necessity. The advantage to the bearing, of the mixing and condensing of the oil-mist is that the homogeneity of oil-mist and the flow is predictable.

The structure of the unit heretofor defined provides for improved mixing and reduced condensing of the oil droplets by creating significantly less turbulence than is produced in other mixing devices. The two separate chambers, one for air and one for oil-mist, are joined by coaxial tubes which provide for mixing of the air and oil-mist with no increase in velocity at the outlet portion of the blending area. The improved mixing and reduced condensing of oil-mist is that the oil-mist quality is predictable and therefore the flow needed by a bearing is predictable.

The unit 100 is mounted onto a machine (not shown) by means of a bracket 141 having bores 142 adapted to receive screws or bolts. A plate 143 connects the bracket 141 with the unit 100 by means of a solvent weld at 144 and 145. However, it is well within the purview of one skilled in the arts to modify the mounting means without detracting from the accomplishments of the invention heretofor described.

We claim;
1. An oil-mist lubrication system for bearings on a machine, comprising:
   a. an oil mist generating means;
   b. a blender-distributor unit, said unit comprises:
      1. a body having an air chamber and an oil-mist chamber;
      2. at least one blending nozzle means connecting with said air chamber;
      3. an oil-mist delivery means for each blending nozzle means connected with said oil-mist chamber and each mounted coaxially with a respective one of said blending nozzle means, each said oil-mist delivery means comprises a tube extending from said oil-mist chamber into the larger diameter of its associated said blending nozzle means providing a blending area for producing lower density oil-mist;
   c. an air supply means, said air supply means comprises:
      1. means to adjustably control main air supply means, said main air supply means being connected to said oil mist generating means to produce an adjustably controlled high density oil mist;
      2. means to control bypass air supply means, said bypass air supply means being connected to said air chamber of said blender-distributor unit to produce an adjustably controlled air supply to said air chamber;
   d. means for distributing said adjustably controlled high density oil-mist to said oil-mist chamber of said blender-distributor unit; and
   e. means for distributing said lower density oil-mist from said blending area to selected areas of said machine, whereby said lower density oil-mist is reclassified on bearings of a machine as its exits through the orifice of a nozzle

2. An oil-mist lubrication system as defined in claim 1 wherein the air and oil-mist are pressurized at the same pressure in the blender-distributor unit.

3. An oil-mist lubrication system as defined in claim 1 wherein the velocity of the air and the velocity of said oil-mist in said blending area is equal.

* * * * *